United States Patent
Valenza et al.

(10) Patent No.: US 9,641,351 B2
(45) Date of Patent: May 2, 2017

(54) JITTER REMOVAL IN DETERMINISTIC NETWORKS

(71) Applicant: CISCO TECHNOLOGY, INC., San Jose, CA (US)

(72) Inventors: Salvatore Valenza, Pomy (CH); Domenico Ficara, Rolle (CH); Roberto Muccifora, Ropraz (CH); Leo Caldarola, Morrens (CH); Davide Cuda, Vaud (CH)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 14/575,832

(22) Filed: Dec. 18, 2014

(65) Prior Publication Data

US 2016/0182215 A1 Jun. 23, 2016

(51) Int. Cl.
| | |
|---|---|
| *H04W 4/00* | (2009.01) |
| *H04L 12/417* | (2006.01) |
| *H04L 12/841* | (2013.01) |
| *H04L 12/26* | (2006.01) |

(52) U.S. Cl.
CPC .......... *H04L 12/417* (2013.01); *H04L 47/283* (2013.01); *H04L 43/0852* (2013.01)

(58) Field of Classification Search
CPC .... H04L 7/0016; H04L 7/0054; H04L 12/417
USPC ........................................................ 370/252
See application file for complete search history.

(56) References Cited

U.S. PATENT DOCUMENTS

| | | | | |
|---|---|---|---|---|
| 7,760,238 | B2* | 7/2010 | Giesen | H04N 5/232 348/211.11 |
| 2002/0097726 | A1* | 7/2002 | Garcia-Luna-Aceves | H04L 12/5695 370/395.31 |
| 2005/0220029 | A1* | 10/2005 | Calluaud | H04L 12/2697 370/241 |
| 2009/0106761 | A1* | 4/2009 | Chandhoke | G06F 9/4881 718/103 |
| 2012/0230186 | A1* | 9/2012 | Lee | H04L 43/028 370/230 |
| 2014/0040317 | A1 | 2/2014 | Valenza et al. | |
| 2015/0333857 | A1* | 11/2015 | Ficara | H04J 3/247 370/458 |

OTHER PUBLICATIONS

Tony T. Lee, "The Kraft's Inequality of Scheduling for Packet-Switched Clos Networks", IEEE Communications Society INFOCOM 2008.

* cited by examiner

*Primary Examiner* — Farah Faroul
(74) *Attorney, Agent, or Firm* — Cindy Kaplan

(57) ABSTRACT

In one embodiment, a method includes receiving packets in a flow at a network device in a deterministic network, wherein at least one of the packets is transmitted from a source out of sync due to collision with another flow at the source, analyzing at the network device, the flow to reconstruct a period of the flow, and processing at the network device, the packets according to the period to synchronize the processing of the packets at the network device with the source and remove jitter from the flow. An apparatus and logic are also disclosed herein.

20 Claims, 7 Drawing Sheets

| CYCLE | 1 | | | | 2 | | | | 3 | | | | 4 | | | |
|---|---|---|---|---|---|---|---|---|---|---|---|---|---|---|---|---|
| TIME | 0 | 1 | 2 | 3 | 0 | 1 | 2 | 3 | 0 | 1 | 2 | 3 | 0 | 1 | 2 | 3 |
| FLOW A | $A_1$ | | | | $A_2$ | | | | $A_3$ | | | | $A_4$ | | | |
| FLOW B | | | $B_1$ | | | $B_2$ | | | $B_3$ | | | $B_4$ | | | $B_5$ | |
| FLOW C | | $C_1$ | | | | | $C_2$ | | | $C_2$ | | $C_3$ | | | | |
| TRANSMITTED | $A_1$ | $C_1$ | $B_1$ | | $A_2$ | | $B_2$ | | $A_3$ | $C_2$ | $B_3$ | | $A_4$ | $C_3$ | $B_4B_5$ | |

FIGURE 4

JITTER REMOVAL IN DETERMINISTIC NETWORKS

TECHNICAL FIELD

The present disclosure relates generally to communication networks, and more particularly, to deterministic networks.

BACKGROUND

Deterministic networking generally attempts to precisely control when a data packet arrives at its destination. A deterministic network may support, for example, applications in industrial automation, process control, vehicle control, professional audio/video studios, or other areas. In the context of industrial automation, Deterministic Ethernet has gained attention as a way to adopt the widely used Ethernet technology for time critical and sensitive tasks such as those that take place in factory plants and vehicles. Deterministic Ethernet promises extremely low packet loss and deterministic reduced jitter for time sensitive traffic. This is typically accomplished through careful ad-hoc scheduling of data streams that is mostly done off-line and often enforces some constraints on streams.

BRIEF DESCRIPTION OF THE FIGURES

FIG. 4 illustrates an example of scheduling for periodic flows.

Corresponding reference characters indicate corresponding parts throughout the several views of the drawings.

DESCRIPTION OF EXAMPLE EMBODIMENTS

Overview

Figure 1:
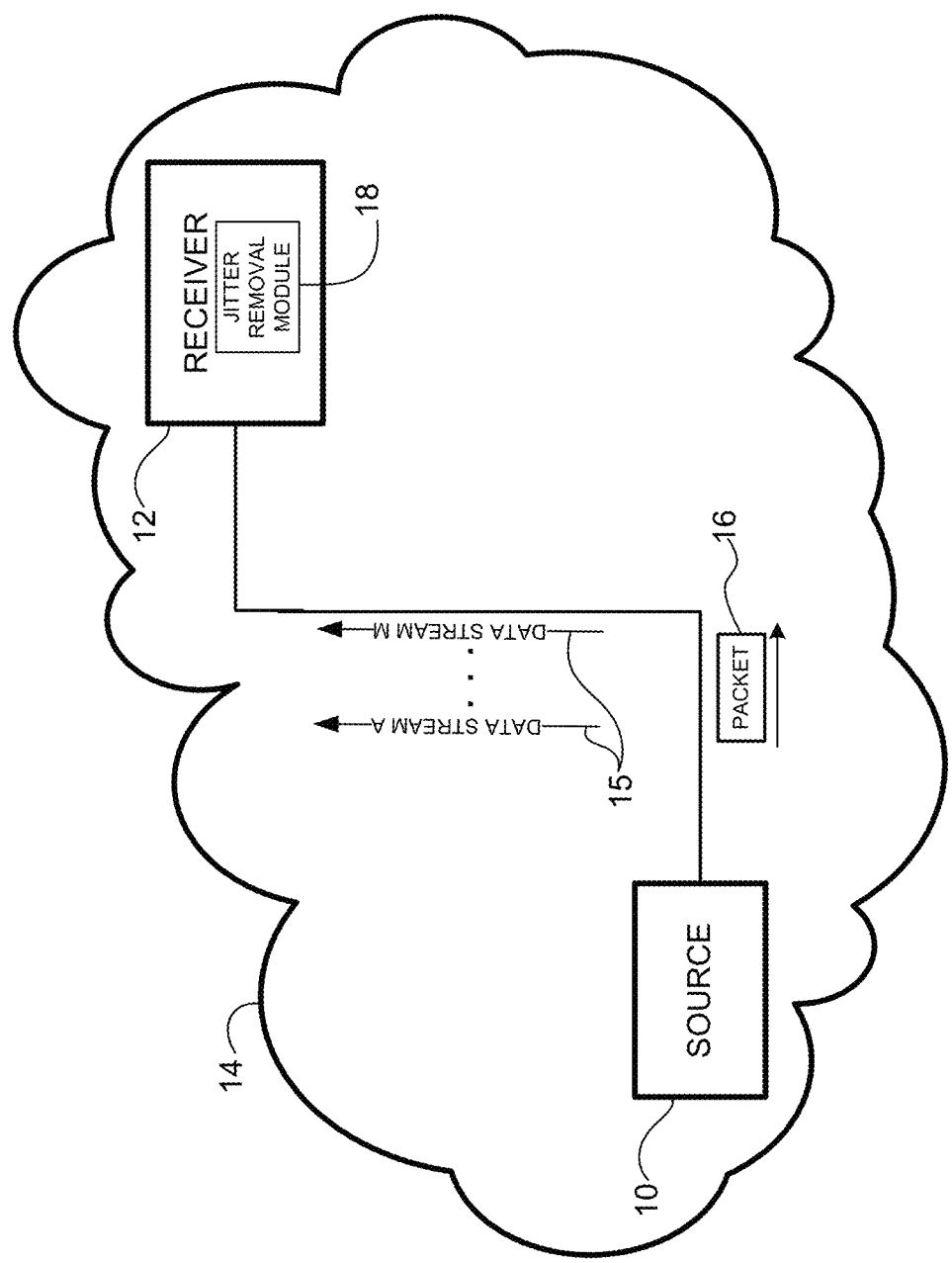
FIG. 1 illustrates an example of a network in which embodiments described herein may be implemented.

In one embodiment, a method generally comprises receiving packets in a flow at a network device in a deterministic network, wherein at least one of the packets is transmitted from a source out of sync due to collision with another flow at the source, analyzing at the network device the flow to reconstruct a period of the flow, and processing at the network device the packets according to the period to synchronize the processing of the packets at the network device with the source and remove jitter from the flow.

In another embodiment, an apparatus generally comprises a network interface for receiving packets in a flow in a deterministic network, wherein at least one of the packets is transmitted from a source out of sync due to collision with another flow at the source, and a processor for analyzing the flow to reconstruct a period of the flow and processing the packets according to the period to synchronize the processing of the packets at the apparatus with the source and remove jitter from the flow.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Deterministic Ethernet applications are intrinsically jitter sensitive. An example includes industrial automation wherein sensors and PLCs (Programmable Logic Controllers) expect to receive data at a predefined point in time. Jitter control is thus paramount in deterministic applications. However, developing techniques that reduce jitter in deterministic networks is both challenging and difficult.

In pure time-slot scheduling systems, because of the discrete nature of slots, there will be at least some jitter. For example, if two flows have different periods, they are bound to collide at a certain slot. The scheduling will therefore provide some jitter as certain packets in the flow are not in sync with what was meant to be transmitted. One option to reduce jitter is to transmit slot information along with a payload of the packet. The slot information is related to the time slot the source wanted to transmit the packet and that likely could not be used because of static assignment to the slots. A drawback with this approach is that the payload of the packet needs to be modified in order to have the slot information transmitted.

The embodiments described herein address the issue of collision of periodic flows and consequent jitter through sync reconstruction at a receiver based on elaboration of the arrival times of the received packets. In one example, the period granularity may be reduced at the time slot level. In certain embodiments, the flow will have zero jitter and the streams can be sent with any period, without restriction. For example, the embodiments may provide complete elimination of the transmission jitter, while allowing for an initial predetermined transient learning time. The embodiments may be used with current Deterministic Ethernet scheduling systems and allow for the treatment of non-periodic flows as is currently done in standard Deterministic Ethernet networks.

Referring now to the drawings, and first to FIG. 1, an example of a network in which embodiments described herein may be implemented is shown. The embodiments operate in the context of a data communications network including multiple network elements. For simplification, only a small number of network elements are shown. The example shown in FIG. 1 includes nodes (e.g., hosts, endpoints, user nodes, client nodes, end stations, sources, receivers, talker nodes, listener nodes) 10, 12 in communication within a network 14.

Data flow paths between the nodes 10, 12 may include any number or type of intermediate nodes (e.g., routers, switches, gateways, or other network devices) and communication links, which facilitate passage of data between the nodes. Also, each node 10, 12 may operate as a source, receiver, or both source and receiver. Network traffic (packets 16) may traverse one or more networks (e.g., local area network, virtual local area network, metropolitan area network, wide area network, enterprise network, Internet, intranet, radio access network, public switched network, or any other network).

According to certain embodiments, network 14 is a deterministic network that implements a deterministic protocol, such as Deterministic Ethernet. Network components (e.g., bridges, routers, switches) in a path from source 10 to destination 12 also implement the deterministic networking architecture to provide latency and delivery requirements. The network 14 may include a path computation element (PCE) (not shown) that determines a communication path via which data is routed through any number of intermediate nodes to arrive at receiver 12. For example, the scheduling and delivery of packets 16 within network 14 may be precisely timed by a PCE. The nodes 10, 12 in network 14 may use a shared timing mechanism to coordinate the sending and receipt of data packets 16 within the network.

Each port in each network device may output packets 16 according to a schedule. The schedule selects packets for transmission from queues. At certain times, referred to as "slots", the port is reserved for transmission from specific queues. The slots are evenly spaced in time and the pattern of queue selection repeats over and over. The period of repetition is called a "cycle". An example of a schedule for periodic flows with reference to slots and cycles is described below with respect to FIG. 4.

Data transmittal may be divided into any number of time slots during which packet 16 may be transmitted. Data packets from any number of data streams (flows) 15 may then be assigned to time slots to schedule the delivery of the packets from the various streams. For example, a packet from data stream A may be assigned to a first time slot, followed by assigning a packet from data stream B to a second time slot.

In the example shown in FIG. 1, node 10 (source, sender) transmits a plurality of data streams (stream A, . . . , stream M) 15 to node 12 (receiver, endpoint). The packets 16 within each stream are initially scheduled to be transmitted at periodic intervals at the source 10, however, due to the discrete nature of time slots, packets within each flow may collide and are transmitted out of sync. Thus, the flows 15 are initially periodic, but due to collision, one or more of the packets 16 are not in sync with what was meant to be transmitted by the source 10.

In certain embodiments, the receiver node 12 includes a jitter removal module 18 operable to remove jitter within the deterministic network 14. As described in detail below, one or more embodiments allow for elimination of transmission jitter, while allowing for a fixed initial transient learning time. For example, in a Deterministic Ethernet cycle with N time slots, windows of N packets 16 may be analyzed in order to reconstruct the periodicity of periodic flows and use their packets with the timing that the source node 10 meant to send them, but could not actually use in transmission because of the static scheduling assignment.

It is to be understood that the network shown in FIG. 1 and described above is only an example and that the embodiments may be implemented in networks having different network topologies or network devices or for use in different applications, without departing from the scope of the embodiments. For example, the deterministic network may include any number of networks or nodes, and there may be any number of intermediate nodes interposed between the source nodes and receiver nodes.

Figure 2:
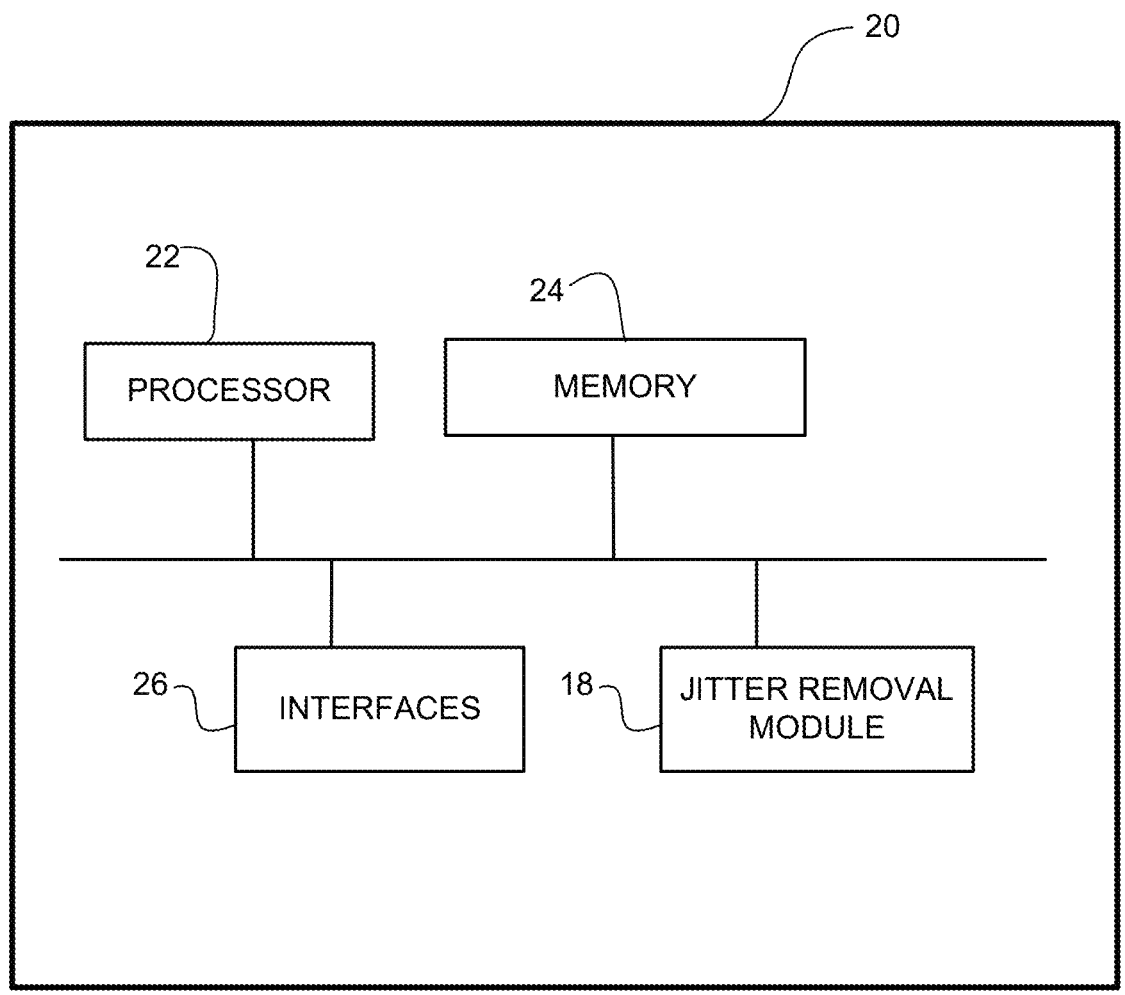
FIG. 2 depicts an example of a network device useful in implementing embodiments described herein.

FIG. 2 illustrates an example of a network device 20 that may be used to implement the embodiments described herein. In one embodiment, the network device 20 is a programmable machine that may be implemented using any suitable combination of hardware, firmware, and software. The network device 20 includes one or more processor 22, memory 24, network interfaces 26, and jitter removal module 18.

In certain embodiments, the jitter removal module 18 comprises software, applications, code, or programs stored in memory 24. The jitter removal module 18 may be implemented using any suitable combination of hardware, firmware, and software. As described in detail below, the jitter removal module 18 is operable to analyze flows in order to reconstruct the original period of the flow so that packets within the flow can be processed in sync with the source, thereby removing jitter. It may be noted that the jitter removal only uses a minimal additional memory as compared to classical Deterministic Ethernet. Normally one or two actions (not entire packets) are kept in memory so that they can be used according to the period recovered. A cycle scheduler may be used to assure that maximum number of slots received is equal in both cases.

Memory 24 may be a volatile memory or non-volatile storage, which stores various applications, operating systems, modules, and data for execution and use by the processor 22. For example, memory 24 may include one or more components of the jitter removal module 18.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The computer-readable medium may be a non-transitory computer-readable storage medium, for example.

The network interfaces 26 may comprise any number of interfaces (linecards, ports) for receiving data or transmitting data to other devices. The network interface 26 may comprise, for example, an Ethernet interface. The network interfaces 26 may be configured to transmit or receive data using a variety of different communication protocols. The interfaces 26 may include mechanical, electrical, and signaling circuitry for communicating data over physical links coupled to the network.

It is to be understood that the network device 20 shown in FIG. 2 and described above is only an example and that different configurations of network devices may be used. The network device 20 may further include any suitable combination of hardware, software, algorithms, processors, modules, devices, mechanisms, components, or elements operable to facilitate the capabilities described herein. For example, the network device 20 may include one or more hardware or software components configured to allocate slots within data transmission cycles according to a schedule.

One aspect of the embodiments is related to the timing that the contents of the packets will be used by the receiver 12. Within Deterministic Ethernet, packets are expected to be received and processed in a precise time slot. The receiving operation and the processing can be decoupled. The packets do not need to be received on a precise time slot, but packets should be processed and used on a precise time. It is therefore important for the receiver 12 to use the data sent by the source 10 with the synchronization defined by the source 10. In the case of periodic flows, in a Deterministic Ethernet context, it is important that the receiver 12 uses the contents of the packets 16 received with the cadence they are to be sent by the source 10.

Each station in Deterministic Ethernet usually listens to all packets, even those not directed to it, for consistency purposes. The receivers 12 have all of the scheduling data about cycle sync and time slot positions available to them. Thus, the receivers 12 have all of the data regarding slot positioning within the cycle and cycle sync.

In certain embodiments, a time slot distance $D_i$ between subsequent packets 16 received for the same flow 15 is measured and the receiver 12 is trained so that the original (initial) period of the signal can be reconstructed. As soon as this operation converges, the receiver 12 can start processing the packets 16 in sync with the source 10, thereby providing essentially zero jitter. With regard to jitter removal, it is acceptable if the first packets of a flow are used with a small jitter as long as all of the subsequent packets are used in sync with the cadence the source intended to use.

Figure 3:
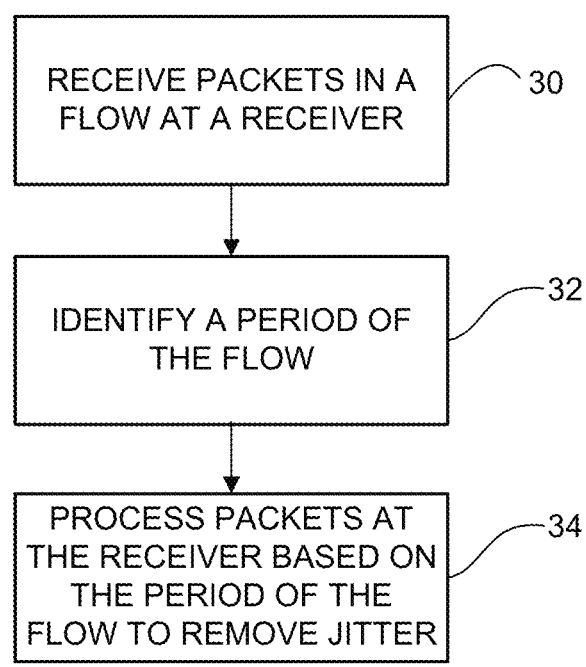
FIG. 3 is a flowchart illustrating a process for jitter removal in deterministic networks, in accordance with one embodiment.

FIG. 3 is a flowchart illustrating an overview of a process for jitter removal in a deterministic network, in accordance with one embodiment. A receiver node (e.g., network device 12 in FIG. 1) in a deterministic network receives packets in a flow (step 30). As described above, the flow is originally periodic and at least one of the packets is transmitted from a source out of sync due to collision with another flow at the source. The receiver 12 analyzes the flow to reconstruct a period of the flow (step 32). The jitter removal module 18 may, for example, analyze windows of packets in order to reconstruct the periodicity of the periodic flow. The receiver 12 processes the packets according to the period to synchronize the processing of the packets with the source 10 and remove jitter from the flow (step 34). The receiver 12 uses the packets with the timing that the source 10 planned to use to send the packets, but could not use due to collision of the periodic flows.

It is to be understood that the process shown in FIG. 3 and described above is only an example and that steps may be added, combined, or modified, without departing from the scope of the embodiments.

The following simplified example illustrates implementation of jitter removal in a deterministic network, in accordance with one embodiment.

FIG. 4 shows scheduling in a system in which there is a cycle of four time slots (0, 1, 2, 3) and three flows (A, B, C) assigned respectively to slot 0, 2, and 1. In this example, flow A has a period of four, flow B has a period of three, and flow C has a period of five. The source 10 would like to transmit according to the timing shown in FIG. 4 for flow A, flow B, and flow C. Due to the discrete nature of the slots, the flows will collide at certain slots. For example, as shown in FIG. 4, flows A and B collide at cycle 3, slot 0, and flows B and C collide at cycle 3, slot 3. The packet transmissions will take place according to the Transmitted row in FIG. 4.

In this example, flow A does not present any jitter because its period is identical to the cycle (both four). Flows B and C, however, present transmission jitter because their periods are not the same as the cycle.

Figure 5:
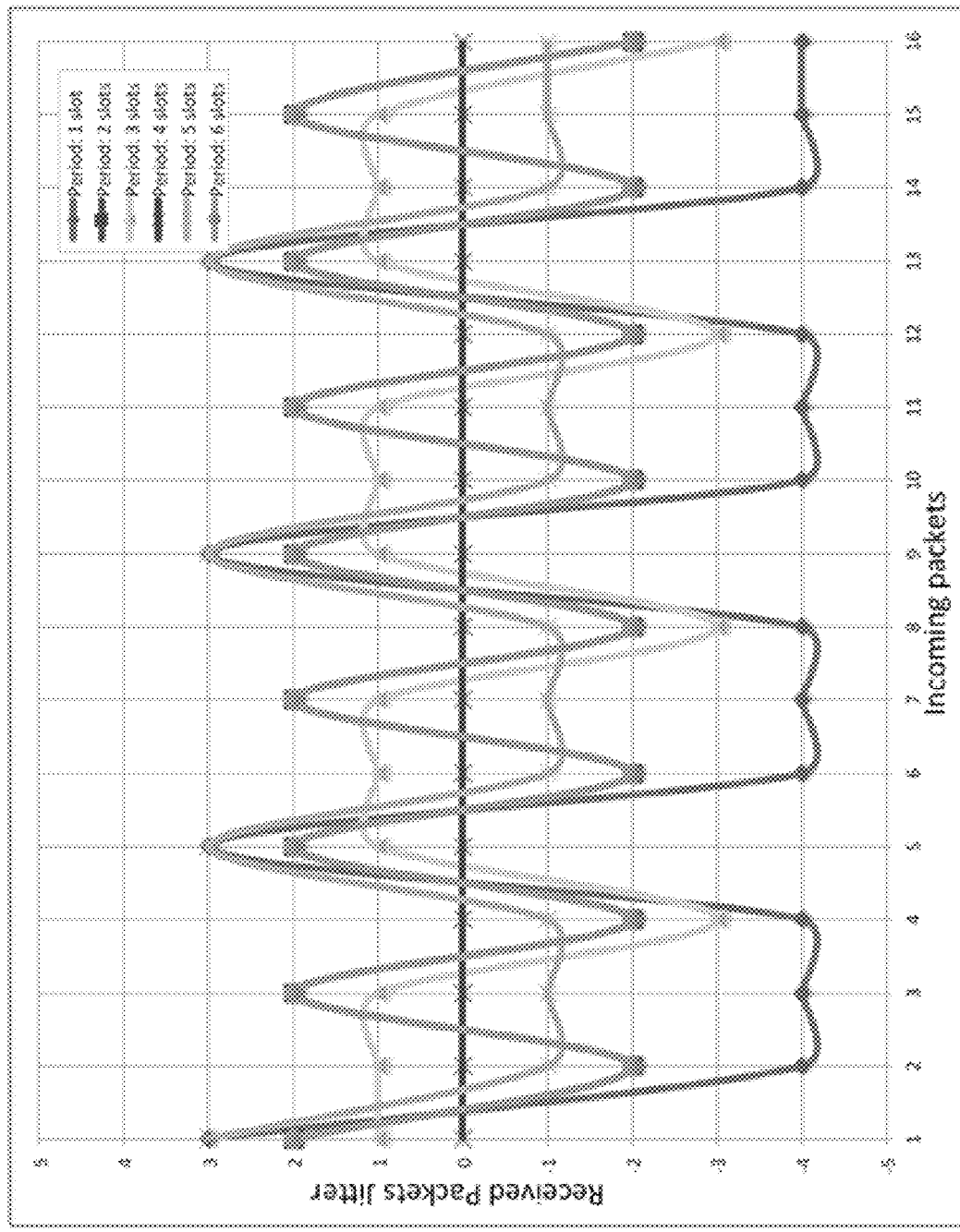
FIG. 5 illustrates received packet jitter for multiple periods for the flows shown in FIG. 4.

FIG. 5 illustrates an example of simulations performed with different periods for the flows. The graph shows received packet jitter for incoming packets for multiple periods. Performing simulations with different periods for the flows and for the same four slot cycles, a trend can be seen for the jitter, as shown in FIG. 5. If the periods are a multiple of the time slot, there will be a periodic trend for the jitter. These trends have periods equal to the number of slots in the cycle (e.g., four in FIG. 5). As noted above for the relation between period and Deterministic Ethernet cycle, one curve shows zero jitter for flows with a period of four.

Figure 6:
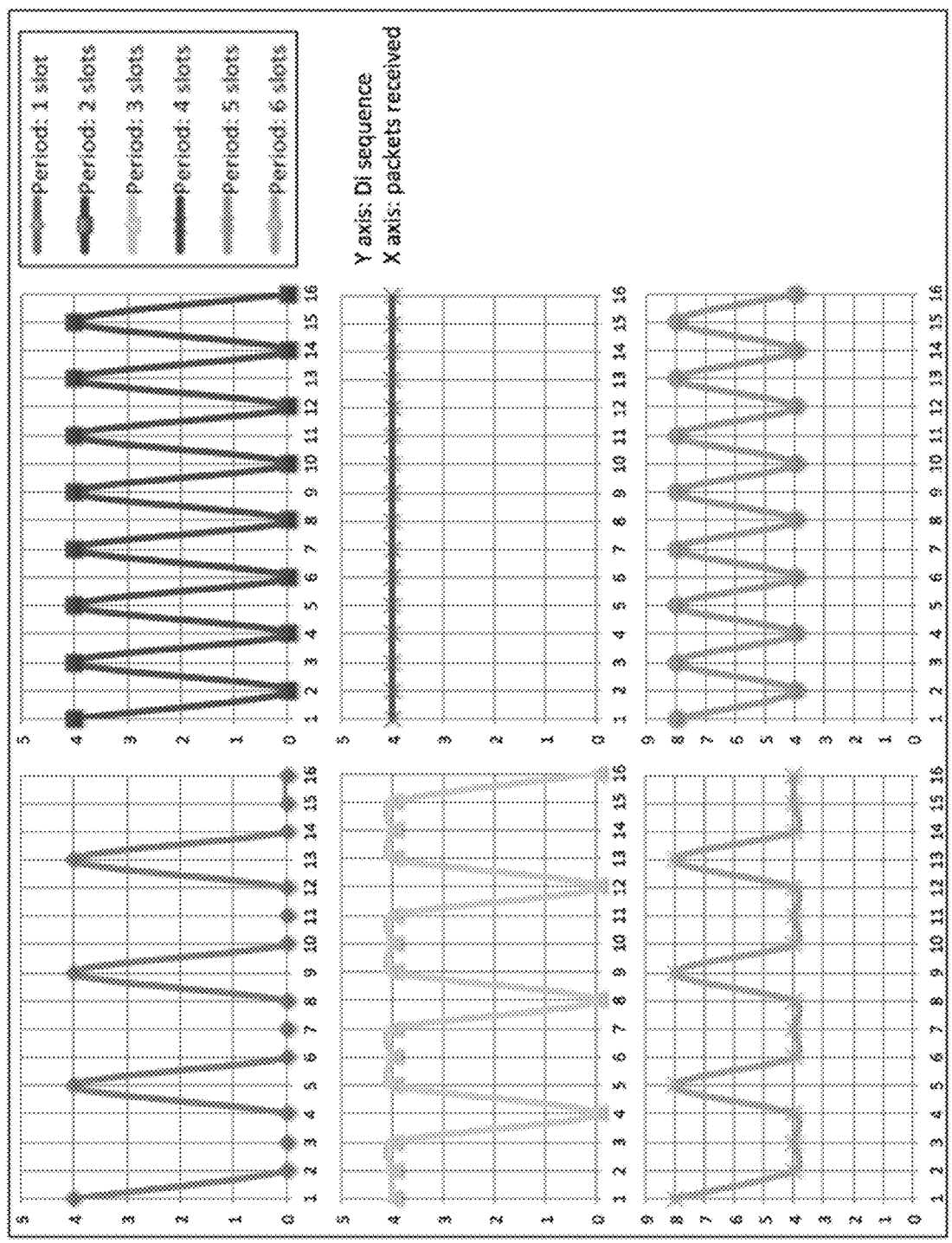
FIG. 6 illustrates trends for a distance between subsequent received packets for the flows shown in FIG. 4.

At the receiver side for the same flows, the distance Di between two subsequent received packets was considered in terms of time slots. FIG. 6 illustrates trends for the distance function Di. The Di sequence is plotted for the received packets. It can be seen that in this case, the trends are also periodic, with a period equal to the number of slots in a cycle. It should be noted that this trend can be evaluated using only data available at the receiver side. Also, the average value of these trends is the actual period of the sequence as it was meant to be at the source side.

Therefore, if N slots make the cycle with a training period of N packets, it is possible to reconstruct the period that the source wanted to use to transmit the packets. From that moment on the contents of the packets can be used according to the measured period, thereby removing jitter for the flow at the processing level at the receiver.

In certain embodiments, the period may be defined using the following formula, for example:

$$P_k = \frac{1}{N} \cdot \sum_{i=k}^{k+N} D_i$$

Wherein:
P is a period;
k is an index;
N is the number of slots in a cycle; and
Di is the distance between packets in terms of slots.

In order to check if the flow is really periodic at runtime, the following example relations may be used:

$$P_k == P_{k+1} \forall k \in \mathbb{N}$$

$$\left(\sum_{i=k}^{k+N} D_i\right) \% N == 0$$

Wherein:
P is a period;
k is an index;
N is the number of slots in a cycle; and
Di is the distance between packets in terms of slots.

If one of the above two equations is not satisfied, the flow is not periodic and can be treated as a normal best effort flow, for example.

Figure 7:
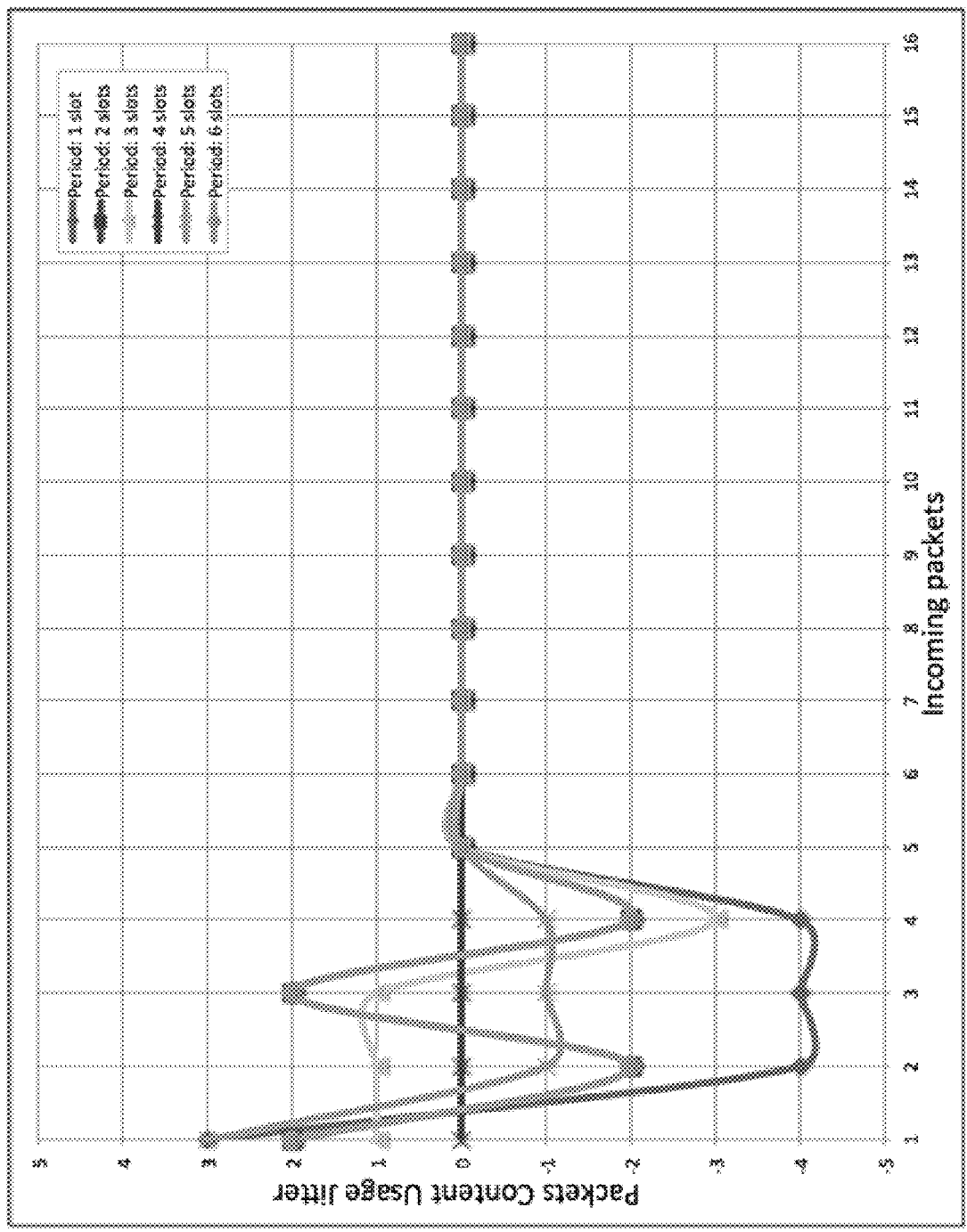
FIG. 7 illustrates content usage jitter with jitter removal embodiments described herein applied to the flows shown in FIG. 4.

FIG. 7 illustrates content usage jitter with the jitter removal embodiments described herein applied. It can be seen that after a transmission time (e.g., training period N=4), due to training at the receiver side, the jitter is completely removed.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving packets in a flow at a network device in a deterministic network, wherein at least one of the packets is transmitted from a source out of sync due to collision with another flow at the source;
   analyzing at the network device, the flow to reconstruct a period of the flow; and
   processing at the network device, the packets according to the period to synchronize the processing of the packets at the network device with the source and remove jitter from the flow.

2. The method of claim 1 wherein analyzing the flow comprises analyzing the flow for a training period of N packets, wherein N is equal to a number of slots within a transmission cycle at the source.

3. The method of claim 1 further comprising determining if the flow is periodic and if the flow is not periodic, processing the flow as a best effort flow.

4. The method of claim 1 further comprising calculating the period based on distances between subsequent packets.

5. The method of claim 4 wherein the period is calculated as:

$$P_k = \frac{1}{N} \sum_{i=k}^{k+N} D_i$$

wherein:
P is a period;
k is an index;
N is the number of slots in a cycle; and
Di is the distance between packets in terms of slots.

6. The method of claim 1 wherein analyzing the flow comprises using data available at the network device.

7. The method of claim 1 wherein the network comprises a Deterministic Ethernet network.

8. The method of claim 1 further comprising receiving packets at the network device for a plurality of flows and reconstructing the period of each of said flows.

9. An apparatus comprising:
   a network interface for receiving packets in a flow in a deterministic network, wherein at least one of the packets is transmitted from a source out of sync due to collision with another flow at the source; and
   a processor for analyzing the flow to reconstruct a period of the flow and processing the packets according to the period to synchronize the processing of the packets at the apparatus with the source and remove jitter from the flow.

10. The apparatus of claim 9 wherein analyzing the flow comprises analyzing the flow for a training period of N packets, wherein N is equal to a number of slots within a transmission cycle at the source.

11. The apparatus of claim 9 wherein the processor is further operable to determine if the flow is periodic and if the flow is not periodic, process the flow as a best effort flow.

12. The apparatus of claim 9 wherein the processor is further operable to calculate the period based on distances between subsequent packets.

13. The apparatus of claim 12 wherein the period is calculated as:

$$P_k = \frac{1}{N} \sum_{i=k}^{k+N} D_i$$

wherein:
P is a period;
k is an index;
N is the number of slots in a cycle; and
Di is the distance between packets in terms of slots.

14. The apparatus of claim 9 wherein analyzing the flow comprises using data available at the apparatus.

15. The apparatus of claim 9 wherein the network comprises a Deterministic Ethernet network.

16. Logic encoded on one or more non-transitory computer readable media for execution and when executed operable to:
   identify packets received in a flow in a deterministic network, wherein at least one of the packets is transmitted from a source out of sync due to collision with another flow at the source;
   analyze the flow to reconstruct a period of the flow; and
   process the packets according to the period to synchronize the processing of the packets with the source and remove jitter from the flow.

17. The logic of claim 16 wherein analyzing the flow comprises analyzing the flow for a training period of N packets, wherein N is equal to a number of slots within a transmission cycle at the source.

18. The logic of claim 16 wherein the processor is further operable to calculate the period based on distances between subsequent packets.

19. The logic of claim 18 wherein the period is calculated as:

$$P_k = \frac{1}{N} \sum_{i=k}^{k+N} D_i$$

wherein:
P is a period;
k is an index;
N is the number of slots in a cycle; and
Di is the distance between packets in terms of slots.

20. The logic of claim 16 wherein the network comprises a Deterministic Ethernet network.

* * * * *